Figure 1:
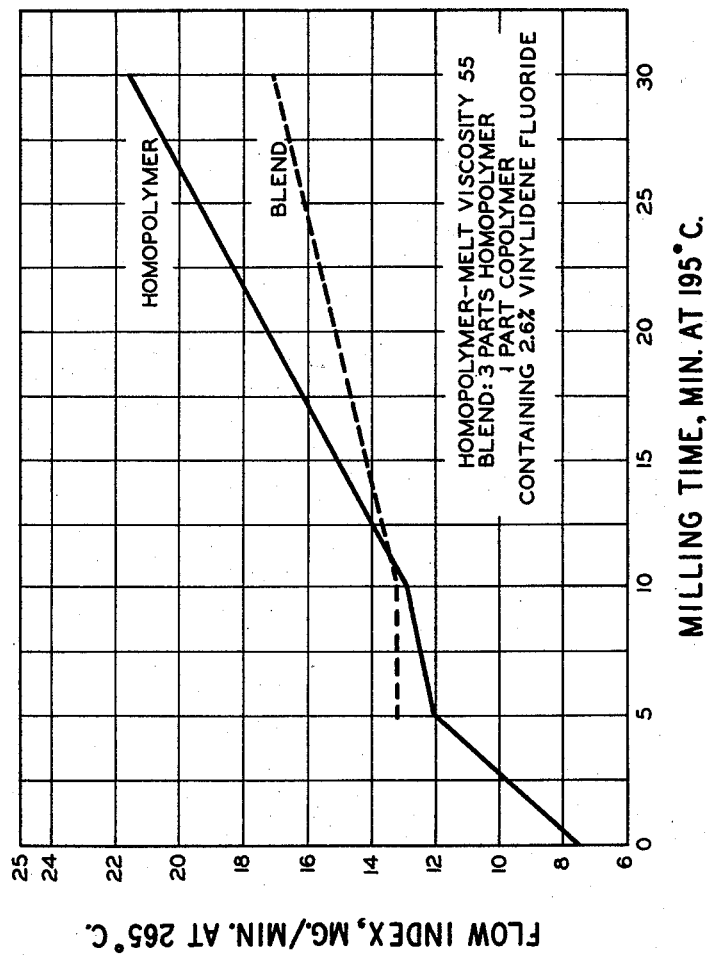

July 12, 1960

S. GATES ET AL 2,944,997

BLEND OF CHLOROTRIFLUOROETHYLENE HOMOPOLYMER AND
CHLOROTRIFLUOROETHYLENE VINYLIDENE
FLUORIDE COPOLYMER

Filed Oct. 3, 1956

4 Sheets-Sheet 1

INVENTORS
STEPHEN GATES
DENNIS H. MULLINS

BY Louis C. Smith
ATTORNEY

INVENTORS
STEPHEN GATES
DENNIS H. MULLINS

United States Patent Office 2,944,997
Patented July 12, 1960

2,944,997

BLEND OF CHLOROTRIFLUOROETHYLENE HOMOPOLYMER AND CHLOROTRIFLUOROETHYLENE VINYLIDENE FLUORIDE COPOLYMER

Stephen Gates, South Charleston, and Dennis H. Mullins, St. Albans, W. Va., assignors to Union Carbide Corporation, a corporation of Delaware Filed Oct. 3, 1956, Ser. No. 613,702

2 Claims. (Cl. 260—45.5)

Fluororesins, of the type represented by chlorotrifluoroethylene polymers, have come into increasing prominence in applications where resistance to high temperatures is required.

However, the very high softening point of these polymers, which is so desirable in service, has posed a thorny problem to plastic technicians, when confronted with the problem of molding or extruding these polymers. In the first place, the softening point or plastic temperature of the polymer is beyond the operating temperature range of the usual fabricating machines. While this difficulty can be overcome by the design of special equipment, the high molding temperatures required pose a special difficulty. This is because at molding temperatures of about 250° C. to 300° C., the chlorotrifluoroethylene polymers of melt viscosity of 50 degrade to polymers of lower molecular weight of melt viscosity 5 to 10. Such lower polymers do not provide the strength, toughness, and freedom from heat embrittlement which are obtained with the higher molecular weight polymers. In order to compensate for this degradation on molding prior practice has been to start with a resin of very high molecular weight, i.e., melt viscosity 80 or above, in the hope of obtaining a resin of the desired molecular weight after degradation has occurred during molding or extrusion. This expedient is not wholly successful as the very high molecular weight polymers require even higher processing temperatures, i.e., above 300° C., which in turn increases the molecular degradation. Thus, in practice, a compromise must be drawn by selecting the highest molecular weight of the final degraded polymers which is consistent with a practical processing temperature for the initial polymer of higher molecular weight. Even so, such processing temperatures are beyond the range of the equipment commonly used.

A way has now been found to mold, mill or extrude the polymers of chlorotrifluoroethylene without resort to the high processing temperatures leading to severe molecular degradation. This is accomplished by blending a copolymer of chlorotrifluoroethylene and vinylidene fluoride with the chlorotrifluoroethylene polymer prior to mechanical working of the copolymer. Such a blend may be sheeted on a two-roll mill for example, at a temperature of 185° C. whereas the chlorotrifluoroethylene polymer cannot be fluxed at this temperature. The incorporation of the copolymer as a fluxing aid does not impair the desirable physical properties of the base polymers, and because lower processing temperatures are required, the degradation problem is minimized.

The copolymers of chlorotrifluoroethylene and vinylidene fluoride which are of value as fluxing or blending agents for chlorotrifluoroethylene polymers may be divided into two classes. The first, and preferred class, are those copolymers containing from 1 to 8 percent by weight combined of vinylidene fluoride in the copolymer. These copolymers are compatible with chlorotrifluoroethylene polymers in all proportions. Also, they are easily prepared as free-flowing granular polymers which facilitates mechanical mixing with the chlorotrifluoroethylene polymers.

The second class are those copolymers containing from 8 to 20 percent by weight of combined vinylidene fluoride. These copolymers are not compatible in all proportions with the chlorothrifluoroethylene resins, but in the range where the two resins are miscible, these copolymers containing a higher amount of vinylidene fluoride also serve as processing or fluxing agents for the base polymer.

While the fuly compatible copolymers containing from 1% to 8% by weight of vinylidene fluoride are miscible in all proportions with chlorotrifluoroethylene polymers, the more useful blends will contain at least 0.2% by weight of contained vinylidene fluoride, such as may be obtained by blending one part by weight of a copolymer containing 1% vinylidene fluoride with four parts by weight of the chlorotrifluoroethylene polymer. The preferred blends will contain at least 0.5% by weight of contained vinylidene fluoride, such as may be obtained by blending 10 parts by weight of a 5% copolymer with 90 parts by weight of the chlorotrifluoroethylene polymer. The advantages gained in processability by blending tend to be off-set by undue loss of strength at high temperatures when the blend contains more than 3% to 5% by weight of contained vinylidene fluoride.

The partially compatible copolymers containing from 8% to 20% vinylidnee fluoride will form useful blends when the homopolymer constitutes at least 50% by weight of the blend, and the proportion of the copolymer in the blend is such that the vinylidene fluoride content of the blend is from 0.5% to 10% by weight of the blend. Preferably, such blends will contain at least 75% by weight of the homopolymer, and the vinylidene fluoride content of the blend is from 0.5% to 5% by weight. All of such blends may be milled or extruded at lower temperatures than are required for the homopolymer.

The distinguishing characteristics of the blends as opposed to the properties of the chlorotrifluoroethylene homopolymers or its copolymer with vinylidene fluoride will be presented from several aspects:

Milling and molding characteristics

Milling tests on a steam-heated, two-roll mill have demonstrated that the blends will flux at lower temperatures than the homopolymer, and when the copolymer blended is of optimum vinylidene fluoride content, at lower temperatures than copolymers of the same vinylidene fluoride content as the blend.

The results of the tests are given below, the homopolymers used for milling and blending having a melt viscosity of 55, the term "ViF$_2$" appearing in the table and others to follow standing for "vinylidene fluoride."

| Composition | ViF₂ Content of Composition, Percent by wt. | ViF₂ Content of Copolymer, Percent by wt. | Copolymer Content of Blend, Percent by wt. | Milling Temp.,¹ °C. |
|---|---|---|---|---|
| Homopolymer | | | | >200 |
| Copolymer | 0.5 | 0.5 | | >200 |
| Blend | 0.55 | 3.8 | 14.5 | 200 |
| Blend | 0.59 | 5.5 | 10.7 | 200 |
| Copolymer | 1.8 | 1.8 | | 190 |
| Blend | 1.7 | 3.8 | 45 | 190 |
| Blend | 1.65 | 5.5 | 30 | 175 |

¹ Lowest milling temperature at which a continuous well-fluxed sheet which adheres to the rolls, can be formed on the mill.

On the basis of these tests, and as confirmed by other tests to be discussed later, a copolymer containing 4% to 7% of vinylidene fluoride is preferred for blending.

In wire-coating studies, it was found that the blends extruded faster, and at lower temperatures, than the homopolymer. Also, because the blends flow more readily in molding, pieces having thin sections can be injection-molded, whereas the homopolymers can be injection-molded in thin sections only with difficulty and with many rejects.

*Reduced molecular weight degradation*

As previously mentioned, the high temperatures required to process the homopolymer cause the resin to degrade in molecular weight during milling, molding and extrusion operations. Thus a commercial grade of homopolymer with a flow index of 7.5 mg./min. at 265° C. (melt viscosity of 55 at 230° C.) will degrade to a flow index of 21.6 (melt viscosity 21) after 30 minutes of milling (loose banding) at 195° C.

On the other hand, blends of the homopolymer and copolymer show much less degradation on processing than the homopolymer. Thus, a blend of three parts by weight of the above homopolymer with one part of a copolymer containing 2.6% vinylidene fluoride had a flow index of 13.2 after 5 minutes milling at 195° C., and the flow index increased to only 17 after an additional milling period of 25 minutes.

Flow index is the rate at which resin at 265° C. is forced through a die having a diameter of 0.0825 inch under an applied pressure of 250 p.s.i.

Melt viscosity is defined as the viscosity in megapoises of the resin at 230° C. as measured on a parallel plate plastometer by the process described by G. J. Dienes and H. F. Klemm in the Journal of Applied Physics, vol. 17, pages 458–471 (1946). The melt viscosity is employed herein as a measure of molecular weight of the resin.

The molecular weight degradation of the above homopolymers and the relative stability of the above blend on milling is shown in Figure 1.

*Properties at high temperature*

An outstanding and surprising characteristic of the blends of this invention is that, although the blends may be milled, extruded or molded at lower fabricating temperatures than the homopolymers and even the copolymers of comparable vinylidene fluoride content, the ultimate strength of the blends at high temperatures is not significantly different from that of the homopolymer. Thus, ease of working is obtained without sacrifice of the service properties at high temperatures of the chlorotrifluoroethylene homopolymers.

The temperature-stiffness relationship of homopolymers, copolymers and blends were studied by means of "secant tensile modulus" measurements over a wide temperature range in an Instron tensile tester. The "secant tensile modulus" is defined as 100 times the force in pounds per square inch required to extend the specimen one percent. This modulus varies inversely with the temperature of the specimen.

Figure 2:
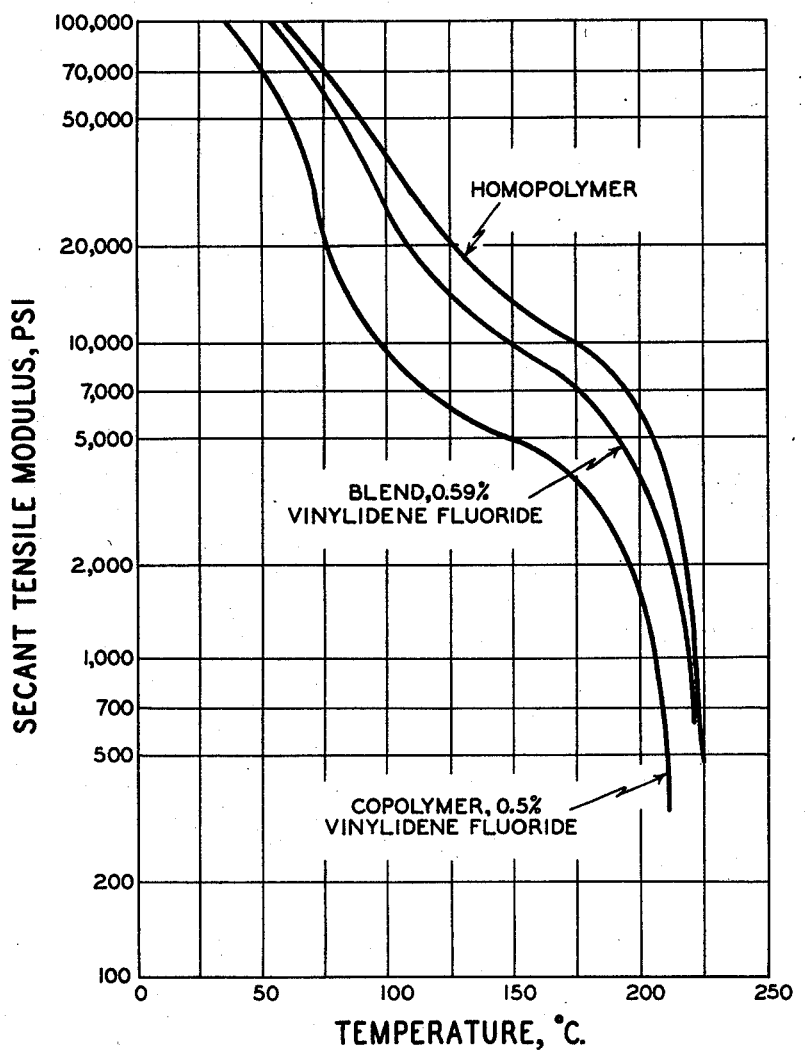

Data in Figure 2 show that a blend containing 0.59% of vinylidene fluoride, which is based on a homopolymer (melt viscosity 55) and a copolymer containing 5.53 percent of vinylidene fluoride, has a stiffness-temperature curve which closely resembles that of the homopolymer. On the other hand, a copolymer of comparable vinylidene fluoride content, 0.5% is significantly softer than either over the whole temperature range.

The temperature ($T_3$) at which a stiffness modulus of 1000 p.s.i. is reached has been selected as a basis for comparison of different fluororesins as it represents a potential maximum use-temperature above which the crystals begin to melt and the plastics become so soft that they will flow under very light loads. With reference to Figure 2, this temperature ($T_3$) is 221° C. for the homopolymer, 220° C. for the blend, and only 207° C. for the copolymer containing 0.5% vinylidene fluoride.

Moreover, this outstanding resistance to softening at high temperatures is obtained only by blending homopolymers and copolymers; it cannot be obtained by blending copolymers of different vinylidene fluoride content to obtain a blend of equivalent vinylidene fluoride content. This is shown by the data in the table to follow:

| Blend Components | ViF₂ Content of Blend, Percent | $T_3$, °C. |
|---|---|---|
| Homopolymer (melt viscosity 55) + copolymer 5.53% ViF₂) | 1.0 | 215 |
| Homopolymer (melt viscosity 55) + copolymer (3.8% ViF₂) | 1.0 | 208 |
| Homopolymer (melt viscosity 55) + copolymer (2.6% ViF₂) | 1.0 | 201 |
| Copolymer (0.5% ViF₂) + copolymer (2.6% ViF₂) | 1.0 | 194 |
| Copolymer (0.5% ViF₂) + copolymer (3.8% ViF₂) | 1.0 | 199 |
| Copolymer (0.5% ViF₂) + copolymer (5.53% ViF₂) | 1.0 | 195 |

Figure 3:
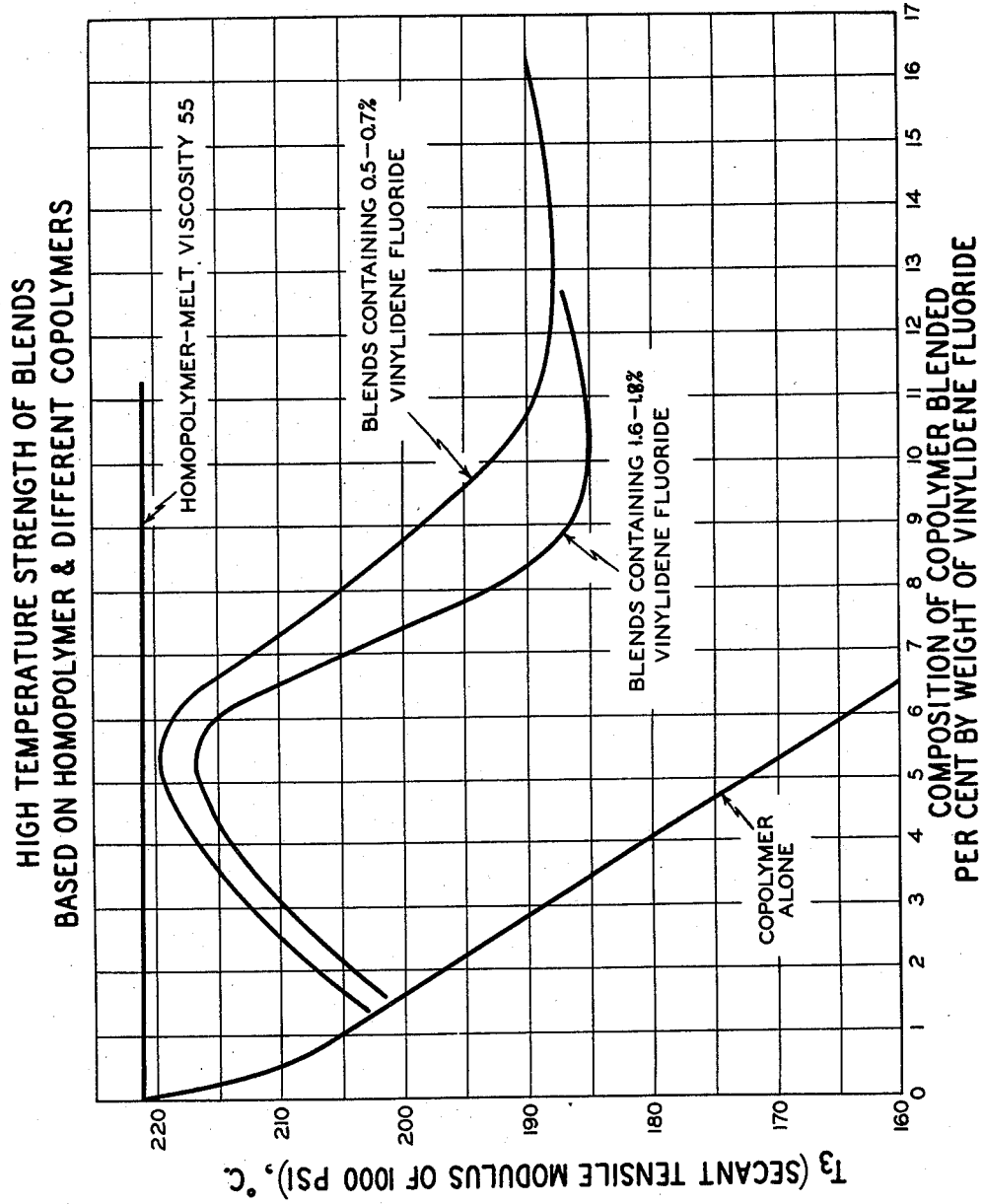

As previously mentioned, the vinylidene fluoride content of the copolymer has an important effect on its blending properties. To demonstrate this, a series of copolymers of different vinylidene fluoride contents were blended with a homopolymer of melt viscosity 55, to form two series of blends, one series having a vinylidene fluoride content of 0.5% to 0.7%, and the other series having a vinylidene fluoride content of 1.6% to 1.8%. The $T_3$ temperature of these blends was then plotted against the vinylidene fluoride content of the copolymer blended with the results shown in Figure 3. Also shown for comparison is the $T_3$ temperature of the copolymers themselves, plotted against their vinylidene fluoride content. As shown, the copolymers alone become increasingly softer as the vinylidene fluoride content increases. On the other hand, for a constant level of vinylidene fluoride content in the blend, the $T_3$ temperature in the blend increases with increasing vinylidene fluoride content of the copolymer blended, until when the copolymer blended contains from 4% to 7% of vinylidene fluoride, the $T_3$ temperature approaches that of the homopolymer itself. When the copolymer blended contains from 5% to 6% vinylidene fluoride, the $T_3$ temperatures for the homopolymer and the blends are practically identical.

*Properties at low temperatures*

While the blends resemble the chlorotrifluoroethylene homopolymer in their retention of strength at elevated temperatures, they retain the freedom from brittleness at low temperatures which is characteristic of the chlorotrifluoroethylene-vinylidene fluoride copolymers. Thus, brittle temperatures range from 16° C. for the homopolymer of melt viscosity 55 down to −18° C. for a copolymer containing 6.53% vinylidene fluoride. Copolymers containing 0.5% to 1.8% vinylidene fluoride have brittle temperatures from 10° C. to −4° C. Blends of copolymers and homopolymers also containing from 0.5% to 1.8% vinylidene fluoride also have approximately the same range of brittle temperatures.

Molecular weight, composition and structure of copolymers

The molecular weight of the copolymer blended has some effect on the properties of the blend, but this is much less pronounced than the effect of the vinylidene fluoride content of the copolymer on the blend properties. To demonstrate this, copolymers of approximately the same molecular weight but differing in composition, as well as copolymers of the same composition, but differing in molecular weight, were blended with a homopolymer of melt viscosity 55 to form a series of blends. The properties of these blends were as follows:

| Copolymer Blends | | ViF$_2$ Content of Blend, Percent | Blend Properties | |
|---|---|---|---|---|
| ViF$_2$, Percent | I$_0$ [1] | | T$_3$, °C. | Brittle Temp., °C. |
| 2.74 | 1.3 | 0.6 | 210 | 5 |
| 5.0 | 1.1 | 0.52 | 219 | 10 |
| 5.53 | 2.64 | 0.58 | 220 | 4 |
| 2.74 | 1.3 | 1.63 | 209 | 4 |
| 5.0 | 1.1 | 1.38 | 214 | 2 |
| 5.53 | 2.64 | 1.65 | 217 | −2 |

[1] I$_0$=Intrinsic viscosity, a measure of molecular weight. This is determined as follows:
One hundred milligrams of resin are dissolved in 50 ml. 1,1,3-trifluoropentachloropropane under reflux. A portion of the solution is filtered into a hot (98–99° C.) modified-Ubblehode viscometer through a sintered glass funnel which is maintained at 100° C. or more by means of a steam jacket. The viscometer is completely immersed in the vapors of refluxing 2-butanol (99° C.), and the reflux time of the resin solution is determined. The intrinsic viscosity is calculated according to the following equation:

$$I_0 = \frac{t-t_0}{t_0} \times \frac{1}{c}$$

where $t$=time of efflux of the resin solution
$t_0$=time of efflux of the pure solvent
$c$=concentration of resin in g./100 cc.

The effect of extrapolating to zero concentration has been found to produce only a negligible correction, and is omitted in the present calculation.

It will be seen from the above table that the composition of the copolymer has more effect on its high temperature properties as measured by the T$_3$ temperature, than does the molecular weight of the copolymers. However, blends made from the copolymers of higher molecular weight have lower brittle temperatures.

Thus, the copolymers useful in this invention may have intrinsic viscosities varying from 0.5 to 5.0, with the preferred range being 0.75 to 3.0.

As previously stated, the copolymers containing from 1% to 8% vinylidene fluoride are preferred because blends containing such copolymers retain the high temperature properties of the base polymer. However, copolymers containing from 8% to 20% vinylidene fluoride are useful fluxing agents for the homopolymer and the T$_3$ temperatures of such blends are in the useful range. Temperature-stiffness data on such blends with a homopolymer of melt viscosity 55 are given in the table to follow:

| Copolymer Blended, Percent ViF$_2$ | ViF$_2$ Content of Blend, Percent | Milling Temp., °C. | Temperature-Stiffness Data | | |
|---|---|---|---|---|---|
| | | | T$_3$, °C. | T$_4$, °C.[1] | T$_5$, °C.[2] |
| 8.1 | 0.6 | 190 | 192 | 129 | 48 |
| 8.1 | 1.6 | 190 | 192 | 126 | 48 |
| 9.6 | 0.6 | 190 | 195 | 142 | 51 |
| 9.6 | 1.6 | 190 | 185 | 122 | 46 |
| 12.7 | 0.6 | 190 | 188 | 144 | 51 |
| 12.7 | 1.6 | 190 | 187 | 126 | 42 |
| 16.4 | 0.6 | 190 | 190 | 134 | 51 |
| 16.4 | 1.6 | 190 | 195 | 136 | 46 |
| 19.5 | 0.6 | 190 | 202 | 149 | 55 |
| 19.5 | 1.6 | 190 | 201 | 144 | 54 |

[1] T$_4$—Temperature at which modulus is 10,000 p.s.i.
[2] T$_5$—Temperature at which modulus is 100,000 p.s.i.

The copolymers of chlorotrifluoroethylene and vinylidene fluoride may be either uniform or non-uniform in polymer distribution. As vinylidene fluoride is the faster component in the copolymerization to form the copolymers useful in this invention, a non-uniform polymer results when the monomers are charged in a given ratio, and polymerization conducted without additions or withdrawals of monomers. A uniform copolymer results when the ratio of monomers is maintained approximately constant throughout the polymerization. This is usually done by additions of vinylidene fluoride to the charge throughout the polymerization. The following table shows the approximate percentage of vinylidene fluoride to be maintained in the monomer mixture in order to obtain a copolymer of the stated composition:

| Vinylidene Fluoride, percent by weight in Monomer Mixture | Vinylidene Fluoride, percent by weight in Copolymer |
|---|---|
| 0.55 | 1 |
| 1.2 | 2 |
| 1.8 | 3 |
| 2.4 | 4 |
| 3.0 | 5 |
| 3.6 | 6 |
| 4.2 | 7 |
| 4.8 | 8 |

Both the copolymers and the homopolymers may be made using as catalysts the bis(perfluoroacyl) peroxides disclosed in U.S. Patent No. 2,700,662 to D. M. Young and B. Thompson.

Figure 4:
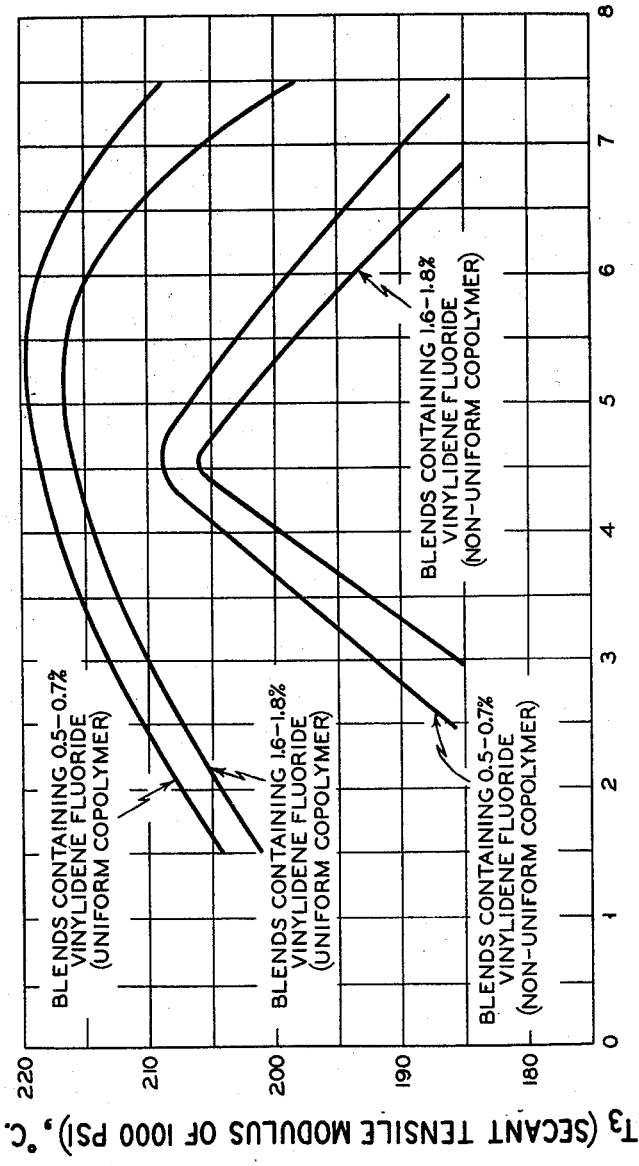

The vinylidene fluoride content of the copolymer has an important effect on the high temperature properties of the blend, regardless of whether the copolymer is uniform or non-uniform in composition. However, the uniform copolymers are preferred because blends containing them approach more closely the high temperature properties of the homopolymer. This effect is shown in Figure 4, the homopolymer blended having a melt viscosity of 55.

Molecular weight of homopolymer

The molecular weight of the homopolymer blended may be varied over a wide range, and it is necessary only that the homopolymer be a solid of adequate strength and toughness, as shown by a minimum melt viscosity of 2. This corresponds to an intrinsic viscosity of about 0.5, as heretofore defined.

Tests have shown that the processing temperatures of homopolymers having such diverse melt viscosities as 5, 50 and 80 can be reduced by blending with copolymers. Preferably, therefore, the homopolymer should have an intrinsic viscosity of at least 0.75. All of such homopolymers having intrinsic viscosities above 0.5 are high-melting resins, as distinguished from oily, greasy or waxy, low-molecular weight polychlorotrifluoroethylenes commonly used as plasticizers.

The following example will show one method of mixing the homopolymer and copolymer. Other methods of mixing involve making dispersions or organosols of the blends by methods known in the art. Suitable dispersants include mixtures of ketones, such as diisobutyl ketone, and aromatic hydrocarbons, such as xylene. In baking such organosols to form coatings, the copolymer greatly improves the flow-out properties of the homopolymer and reduces the fusion temperature.

*Example 1.*—A mechanical mixture consisting of equal parts of a chlorotrifluoroethylene-vinylidene fluoride copolymer which contained 6.25 percent vinylidene fluoride, by analysis, and a chlorotrifluorethylene homopolymer (melt viscosity 55) fluxed readily on a laboratory two-roll mill heated to 180° C.

Inasmuch as the homopolymer could not be fluxed at this temperature, the value of the copolymer as a processing aid is apparent.

The following data demonstrate that the improvements obtained by blending do not impair the physical properties of the base homopolymer.

| Resin | Blend | Homo-polymer |
|---|---|---|
| Tensile strength,[1] p.s.i. | 3,700 | 4,200 |
| Elongation,[1] percent | 50 | 25 |
| Stiffness modulus,[2] p.s.i. | 122,000 | 140,000 |
| $T_F$, °C.[3] | 32 | 47 |
| $T_i$, °C.[3] | 104 | 119 |
| Izod impact,[4] ft. lbs. per inch of notch at −50° C. | 0.9 | 1.3 |

[1] As determined on a Scott L-6 Tensile Tester operating at an ambient temperature of 25° C. and at a constant rate of elongation of 48 in. per min.
[2] A.S.T.M. Method D-747-50.
[3] A.S.T.M. Method D-1043-51. $T_F$ is the point corresponding to 135,000 p.s.i. and $T_i$ to 10,000 p.s.i. on the stiffness-temperature curve.
[4] Tests run of annealed samples. The other tests are on quenched samples.

What is claimed is:

1. A plastic composition having a secant tensile modulus above 1000 lbs. per sq. in. at temperatures below 215° C. comprising a blend of a solid resinous homopolymer of chlorotrifluoroethylene intimately admixed with a copolymer of chlorotrifluoroethylene and vinylidene fluoride containing from 5% to 6% by weight of vinylidene fluoride and from 94% to 95% by weight of chlorotrifluoroethylene and having an intrinsic viscosity of 0.75 to 3.0, the proportions of the homopolymer and copolymer in the blend being such that the vinylidene fluoride content of the blend is at least 0.5% by weight and not more than 1.8% by weight.

2. A plastic composition as claimed in claim 1 in which the copolymer of chlorotrifluoroethylene and vinylidene fluoride is formed by polymerizing a monomer mixture containing from 3.0% to 3.6% by weight of vinylidene fluoride and in which mixture the ratio of vinylidene fluoride monomer to chlorotrifluoroethylene monomer is maintained approximately constant throughout the polymerization.

References Cited in the file of this patent

UNITED STATES PATENTS

| 2,770,606 | Teeters et al. | Nov. 13, 1956 |
| 2,789,959 | Smith | Apr. 23, 1957 |